US012158083B2

(12) United States Patent
Propheter-Hinckley et al.

(10) Patent No.: US 12,158,083 B2
(45) Date of Patent: Dec. 3, 2024

(54) AIRFOIL WITH AXIAL COOLING SLOT HAVING DIVERGING RAMP

(71) Applicant: RAYTHEON TECHNOLOGIES CORPORATION, Farmington, CT (US)

(72) Inventors: Tracy A. Propheter-Hinckley, Rocky Hill, CT (US); Dominic J. Mongillo, Jr., West Hartford, CT (US); Allan Nyairo Arisi, Rocky Hill, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/988,917

(22) Filed: Nov. 17, 2022

(65) Prior Publication Data

US 2023/0151737 A1 May 18, 2023

Related U.S. Application Data

(60) Provisional application No. 63/315,674, filed on Mar. 2, 2022, provisional application No. 63/281,041, filed on Nov. 18, 2021.

(51) Int. Cl.
*F01D 5/18* (2006.01)
(52) U.S. Cl.
CPC .......... *F01D 5/18* (2013.01); *F05D 2220/32* (2013.01); *F05D 2230/21* (2013.01); *F05D 2260/20* (2013.01)
(58) Field of Classification Search
CPC .... F01D 5/18; F05D 2220/32; F05D 2230/21; F05D 2260/20
See application file for complete search history.

(56) References Cited

U.S. PATENT DOCUMENTS

| | | | | |
|---|---|---|---|---|
| 8,827,647 | B1* | 9/2014 | Liang | F01D 5/187 416/97 R |
| 2003/0044276 | A1* | 3/2003 | Leeke | F01D 5/186 416/97 R |
| 2003/0108423 | A1* | 6/2003 | Morgan | F01D 5/187 416/97 R |
| 2003/0129054 | A1* | 7/2003 | Manning | F01D 5/187 415/115 |
| 2003/0138322 | A1* | 7/2003 | Boury | F01D 5/187 416/97 R |

(Continued)

FOREIGN PATENT DOCUMENTS

| EP | 1016773 | | 7/2000 | |
|---|---|---|---|---|
| EP | 1016773 | A2 * | 7/2000 | ............. F01D 5/187 |

OTHER PUBLICATIONS

European Search Report for European Patent Application No. 22208282.8 mailed Jan. 27, 2023.

*Primary Examiner* — David E Sosnowski
*Assistant Examiner* — Theodore C Ribadeneyra
(74) *Attorney, Agent, or Firm* — Carlson, Gaskey & Olds, P.C.

(57) ABSTRACT

An airfoil includes a platform and an airfoil section that extends from the platform. The airfoil defines leading and trailing ends and suction and pressure sides. The airfoil section has a transition region through which the airfoil section blends into the platform. The trailing end of the airfoil section has an axial cooling slot opening through the transition region and defines a circumferentially diverging ramp in the transition region.

15 Claims, 5 Drawing Sheets

(56) References Cited

U.S. PATENT DOCUMENTS

| | | | |
|---|---|---|---|
| 2005/0249593 A1* | 11/2005 | Boury | F01D 9/041 |
| | | | 416/97 R |
| 2008/0138208 A1* | 6/2008 | Walters | F01D 5/14 |
| | | | 249/175 |
| 2012/0076654 A1 | 3/2012 | Maldonado et al. | |
| 2013/0298400 A1* | 11/2013 | Munshi | F01D 11/14 |
| | | | 29/889.1 |
| 2014/0000262 A1* | 1/2014 | Boeke | F01D 9/065 |
| | | | 60/726 |
| 2014/0219815 A1* | 8/2014 | Kohli | F01D 5/187 |
| | | | 416/97 R |
| 2014/0271153 A1* | 9/2014 | Uskert | F01D 5/284 |
| | | | 415/177 |

* cited by examiner

AIRFOIL WITH AXIAL COOLING SLOT HAVING DIVERGING RAMP

CROSS-REFERENCE TO RELATED APPLICATION

The present disclosure claims the benefit of U.S. Provisional Application No. 63/281,041 filed Nov. 18, 2021 and U.S. Provisional Application No. 63/315,674 filed Mar. 2, 2022.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

An airfoil according to an example of the present disclosure includes a platform, and an airfoil section that extends from the platform and defines leading and trailing ends and suction and pressure sides. The airfoil section has a transition region through which the airfoil section blends into the platform. The trailing end of the airfoil section has an axial cooling slot that opens through the transition region and defines an circumferentially diverging ramp in the transition region.

In a further embodiment of any of the foregoing embodiments, the circumferentially diverging ramp is radially open.

In a further embodiment of any of the foregoing embodiments, the circumferentially diverging ramp is radially sloped.

In a further embodiment of any of the foregoing embodiments, the circumferentially diverging ramp has first and second circumferential edges and a radial floor there between that is bowed from the first circumferential edge to the second circumferential edge.

In a further embodiment of any of the foregoing embodiments, the platform defines a core gas path surface, and the radial floor is radially offset from the core gas path surface.

In a further embodiment of any of the foregoing embodiments, the platform defines a platform trailing end, and the circumferentially diverging ramp has first and second circumferential edges that diverge from each other toward the platform trailing end.

In a further embodiment of any of the foregoing embodiments, the airfoil section includes a barrier coating on the circumferentially diverging ramp, and wherein the axial cooling slot with the barrier coating is non-metering for cooling flow there from.

In a further embodiment of any of the foregoing embodiments, the circumferentially diverging ramp is radially open and radially sloped.

In a further embodiment of any of the foregoing embodiments, the platform defines a platform trailing end, and the circumferentially diverging ramp has first and second circumferential edges that diverge from each other toward the platform trailing end.

In a further embodiment of any of the foregoing embodiments, the circumferentially diverging ramp has a radial floor between the first and second circumferential edges that is bowed from the first circumferential edge to the second circumferential edge.

In a further embodiment of any of the foregoing embodiments, the transition region does not have any inflection points, is tangent to both the surface of the airfoil section, and is also tangent to a gas path surface on the platform.

A gas turbine engine according to an example of the present disclosure includes a compressor section, a combustor in fluid communication with the compressor section, and a turbine section in fluid communication with the combustor. The turbine section has airfoils as in any of the foregoing embodiments.

In a further embodiment of any of the foregoing embodiments, the circumferentially diverging ramp is radially open.

In a further embodiment of any of the foregoing embodiments, the circumferentially diverging ramp is radially sloped.

In a further embodiment of any of the foregoing embodiments, the circumferentially diverging ramp has first and second circumferential edges and a radial floor there between that is bowed from the first circumferential edge to the second circumferential edge.

In a further embodiment of any of the foregoing embodiments, the platform defines a core gas path surface, and the radial floor is radially inboard of the core gas path surface.

In a further embodiment of any of the foregoing embodiments, the platform defines a platform trailing end, and the circumferentially diverging ramp has first and second circumferential edges that diverge from each other toward the platform trailing end.

In a further embodiment of any of the foregoing embodiments, the airfoil section includes a barrier coating on the circumferentially diverging ramp, and wherein the axial cooling slot with the barrier coating is non-metering for cooling flow there from.

An investment casting core according to an example of the present disclosure includes a refractory core body for investment casting an air airfoil that has a platform and airfoil section that extends from the platform and defines leading and trailing ends and suction and pressure sides. The airfoil section has a transition region through which the airfoil section blends into the platform. The trailing end of the airfoil section has an axial cooling slot that opens through the transition region and defines a circumferentially diverging ramp in the transition region. The core body includes a core body trailing edge that has an enlarged lobe that is configured to form the circumferentially diverging ramp.

In a further embodiment of any of the foregoing embodiments, the enlarged lobe is enlarged in a circumferential direction.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
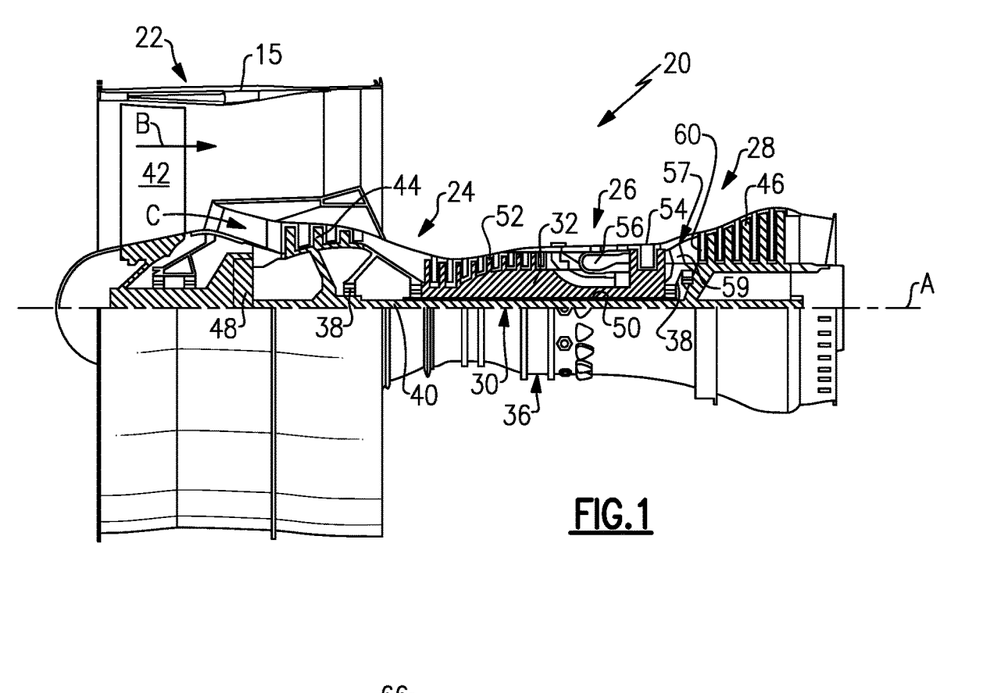
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core gas path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 that are in the core gas path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(\text{Tram } °R)/(518.7°R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
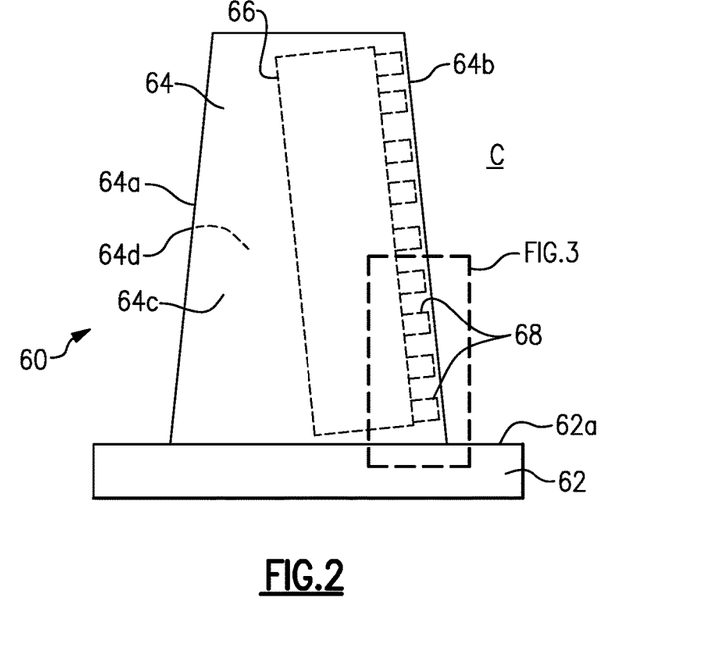
FIG. 2 illustrates an airfoil of the engine.

FIG. 2 illustrates an example airfoil 60 from the turbine section 28 of the engine 20. As will be evident from the following description, the airfoil 60 provides examples of several potential manufacturing scenarios that are related to, and form a basis of, this disclosure. The airfoil 60 is depicted as a blade, but it is to be understood that the examples herein are also applicable to vanes. The airfoil includes a platform 62 and an airfoil section 64 that extends from the platform. The platform 62 defines a core gas path surface 62a that serves to bound a portion of the core gas path C of the engine 20. The airfoil section 64 includes leading and trailing ends 64a/64b and suction and pressure sides 64c/64d. An internal cooling passage 66 in the airfoil section 64 receives cooling (bleed) air from the compressor section 24 of the engine 20. The trailing end 64b of the airfoil section 64 includes axial cooling slots 68 that are connected with the cooling passage 66. The axial cooling slots 68 extend through the trailing end 64b and serve as exits for the cooling air to be discharged from the cooling passage 66 into the core gas path C. For example, the axial cooling slot 68 may i) extend through the circumferential mid-line of the trailing end 64b and open at the trailing edge, ii) extend circumferentially and open at the pressure side 64d near the trailing edge, or iii) open in a conjoined matter at the pressure side 64d and trailing edge.

Figure 3:
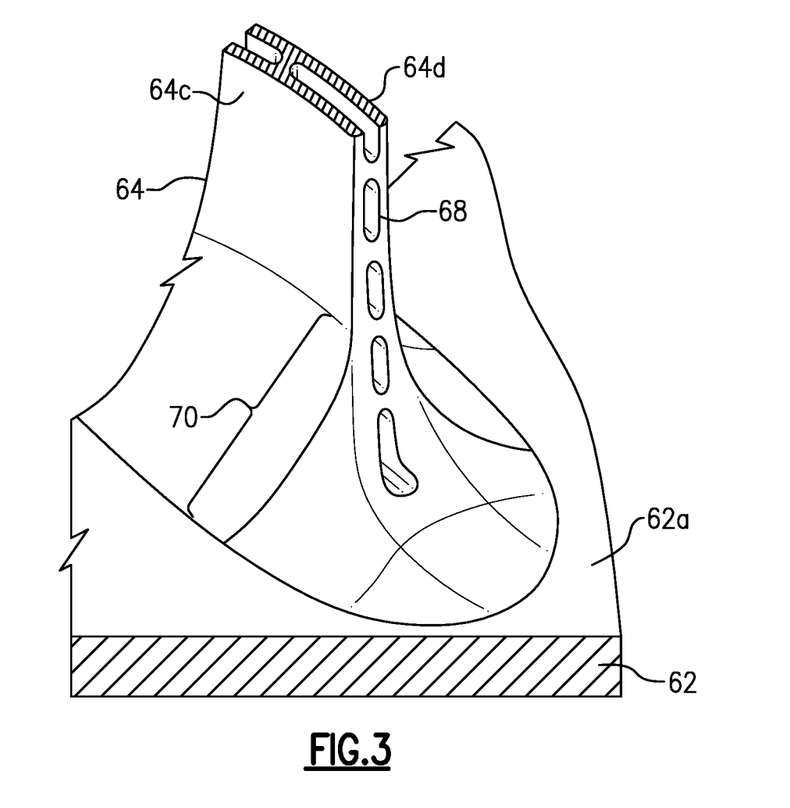
FIG. 3 illustrates a view of a portion of the airfoil of FIG. 2.

FIG. 3 shows a portion of the airfoil 60 from the region indicated in FIG. 2. The airfoil 64 has a transition region 70 through which the airfoil 64 blends into the platform 62. The transition region 70 may be or may include what is known as the fillet region. For example, the transition region 70 is a curved-surface region that does not have any inflection points (points where there is an inversion in direction of curvature), is tangent on one end to the aerodynamic surface of the airfoil 64, and is also tangent on its other end to the gas path surface 62a. Rather than a continuance of the aerodynamic surface of the airfoil 64 and the gas path surface 62a to meet at a corner, the transition region 70 provides a soft blend between the aerodynamic surface of the airfoil 64 and the gas path surface 62a. As shown, at least one of the axial cooling slots 68 opens through the transition region 70.

The airfoil 60 is formed of a metal alloy, such as a Ni- or Co-based superalloy, and is fabricated by investment casting. For instance, in investment casting, a refractory metal or ceramic investment core is arranged in a mold and coated with a wax material, which ultimately defines the geometry of the airfoil 60. The wax material is then coated with another material, such as a metallic or ceramic slurry that is hardened into a shell. The wax is melted out of the shell and molten metal is then poured into the cavity that remains between the shell and the core. The metal solidifies around the core to form the airfoil. The core is then removed in a known manner, leaving internal passages within the airfoil.

Figure 4:
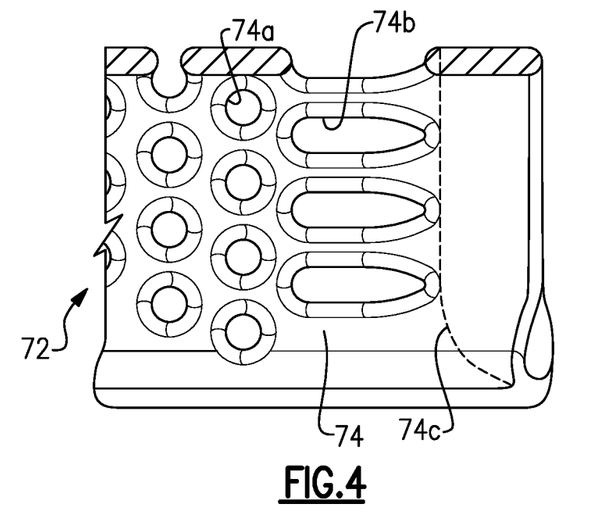
FIG. 4 illustrates an investment casting core for manufacturing the airfoil of FIG. 2.

FIG. 4 illustrates a representative portion of an example investment core 72 for forming the internal cooling passage 66 and axial cooling slots 68 in the airfoil 60. The investment core 72 represents a negative of the cooling passage 66 and axial cooling slots 68 in which solid structures of the investment core 72 produce void structures in the airfoil 60 and void structures of the investment core 72 produce solid structures in the airfoil 60. The investment core 72 includes a refractory metal or ceramic core body 74. In this example, the core body 74 includes pedestal openings 74a for forming pedestals in the internal cooling passage 66 and teardrop openings 74b for forming teardrop features that radially bound and define the axial cooling slots 68. As will be appreciated, the investment core 72 may alternatively or additionally include other openings and geometries depending on the particular design of the airfoil 60 for its desired end use performance Aft of the teardrop openings 74b the trailing end portion of the investment core 72 includes an oversize region 74c, the function of which will be described in more detail below.

Figure 5:
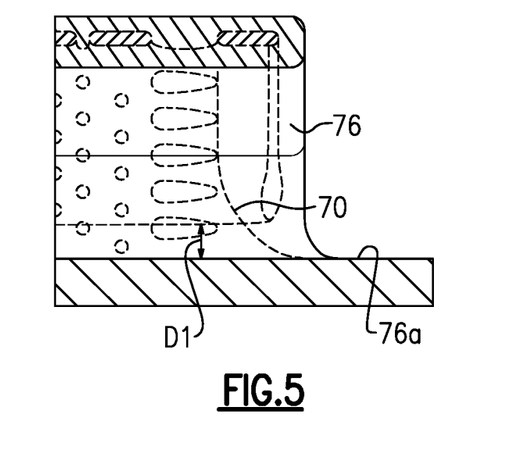
FIG. 5 illustrates a relative position of the core embedded in wax.
Figure 6:
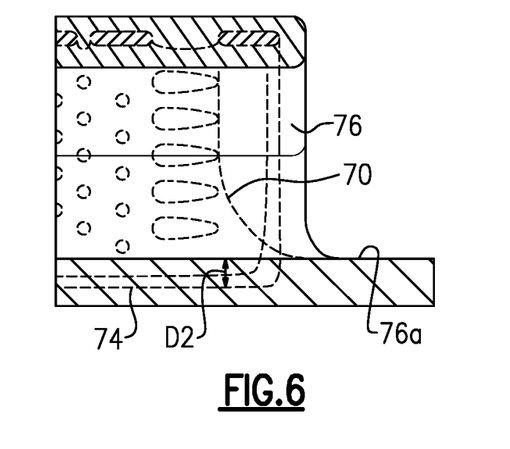
FIG. 6 illustrates another relative position of the core embedded in wax.

In the investment casting process, the relative position of the investment core 72 in the wax 76 (and thus also the relative position of the cooling passage 66 and axial cooling slots 68 in the airfoil 60) is subject to tolerances of the tooling and techniques that are used. For instance, the actual position of the investment core 72 and the actual position of the wax 76 can differ from their nominal design positions. As a result, in some instances as represented in FIG. 5, the investment core 72 may be radially-outwardly displaced such that it is a radial distance D1 above the surface 76a of the wax 76 (which corresponds to the gas path surface 62a in the final airfoil 60). In other instances, as represented in FIG. 6, the investment core 72 may be radially-inwardly displaced such that it is a radial distance D2 below the surface 76a of the wax 76.

After the shell is molded around the wax 76 and the molten metal is poured to form the airfoil 60, the metal encases the trailing end of the refractory casting core 72, i.e., the oversize region 74c. Therefore, the axial cooling slots 68 of the airfoil 60 are initially closed-off after casting. A portion of the metal that encases the oversize region 74c is then machined back in order to open the axial cooling slots 68.

Figure 7:
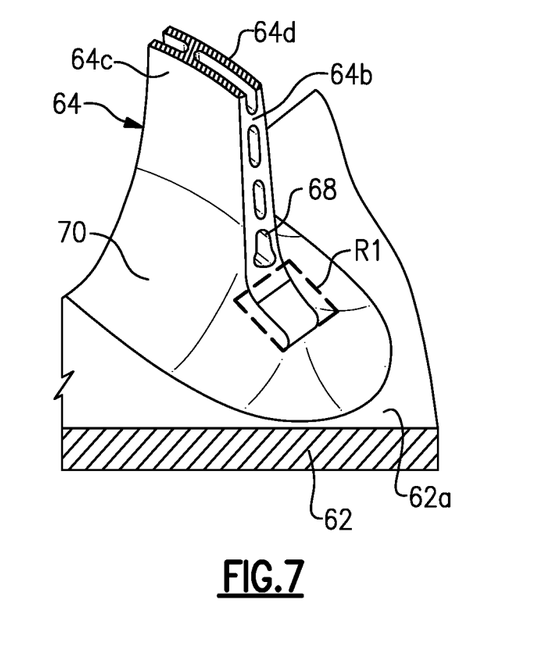
FIG. 7 illustrates the airfoil geometry that results from casting around the core as in FIG. 5.
Figure 8:
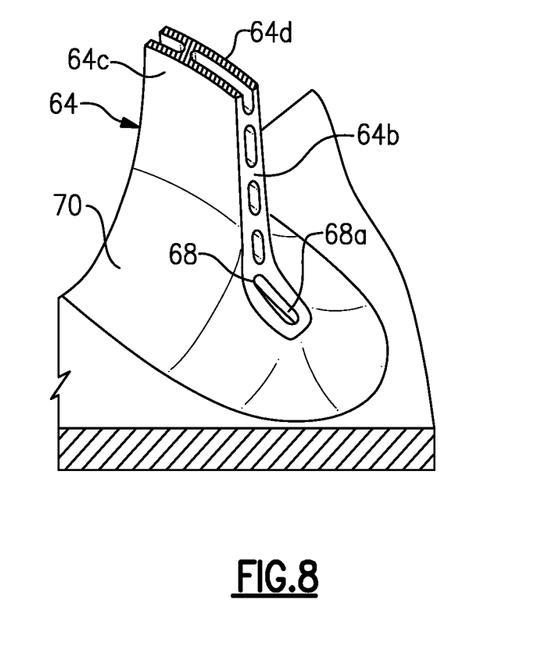
FIG. 8 illustrates the airfoil geometry that results from casting around the core as in FIG. 6.

In the instance of FIG. 5 where the investment core 72 is radially-outwardly displaced, the result is that the radially inner-most axial cooling slot 68 is displaced radially outwardly from the gas path surface 62a, which is shown in FIG. 7. In the instance of FIG. 6 where the investment core 72 is radially-inwardly displaced, the result is that the radially inner-most axial cooling slot 68 is displaced radially inwardly from the gas path surface 62a, which is shown in FIG. 8. In either instance, there may be a detriment to performance and/or manufacturing. For example, in the instance of FIG. 7, there is a region R1 that is a relatively large mass of solid metal. Such a mass, which is not the design intent, may influence thermal transfer and thus effect airfoil durability. In the instance of FIG. 8, the truncated axial cooling slot 68 leaves a dead-ended pocket 68a in the transition region 70. The dead-ended pocket 68a i) may collect grind chips during manufacturing that are difficult to remove and ii) has relatively sharp edges that may collect debris during operation. Moreover, even if a portion of the pocket 68a is initially open, the opening may be of such small size that it is filled by coating material in subsequent processes to deposit a barrier coating on the airfoil 60. Accordingly, in either of the instances above, the relative displacement of the investment core 72 may lead to undesired features in the final airfoil 60.

The machining of the airfoil 60 may be limited by the grind wheel sizing and accessibility to the area. In general, relatively small grind wheels have lower life, produce rougher finished surfaces, require higher operator skill, increase "touch" time, and challenge consistent repeatable finished geometry. To mitigate at least the scenario of FIG. 5, a buffer distance is maintained between the nominal design position of the refractory casting core 72 and the gas path surface 62a so that even if the core 72 is displaced inwardly it is still radially above the core gas path surface 62a. The buffer distance provides space to envelope the core 72 in wax with sufficient transition to allow for proper molten metal to fill in the trailing edge core slip envelope, represented by region 74c, without the need to hand finish the transition region 70 and thus enable a constant repeatable product.

The mitigation may be more effective on relatively large airfoils where the tolerances are a relatively small fraction of the trailing edge radial length. However, as the parts become smaller the same tolerances and the minimum wax thickness and transition requirements for proper metal flow become a significant percentage of the trailing edge length. This may be exacerbated on dual gas-path vanes where the reduction in cooled trailing edge exit is doubled. Thus, on smaller parts it is common to run the wax slip envelopment into the gas paths and accept that the area will have major geometric compromises. Such compromises may take two forms. The first involves hand finishing the entire interface with a grinding belt, resulting in a higher geometric variability that may affect geometric accuracy of the region. The second involves CNC grinding or electric discharge machining to consistently cut the trailing edge within tolerances just above the gas path and apply the standard break edges. Although each of these compromises can meet design requirements for the resultant finished airfoil 60, there are inevitably debits to performance and manufacturing from the geometry variations that must be balanced in a given design.

Figure 9:
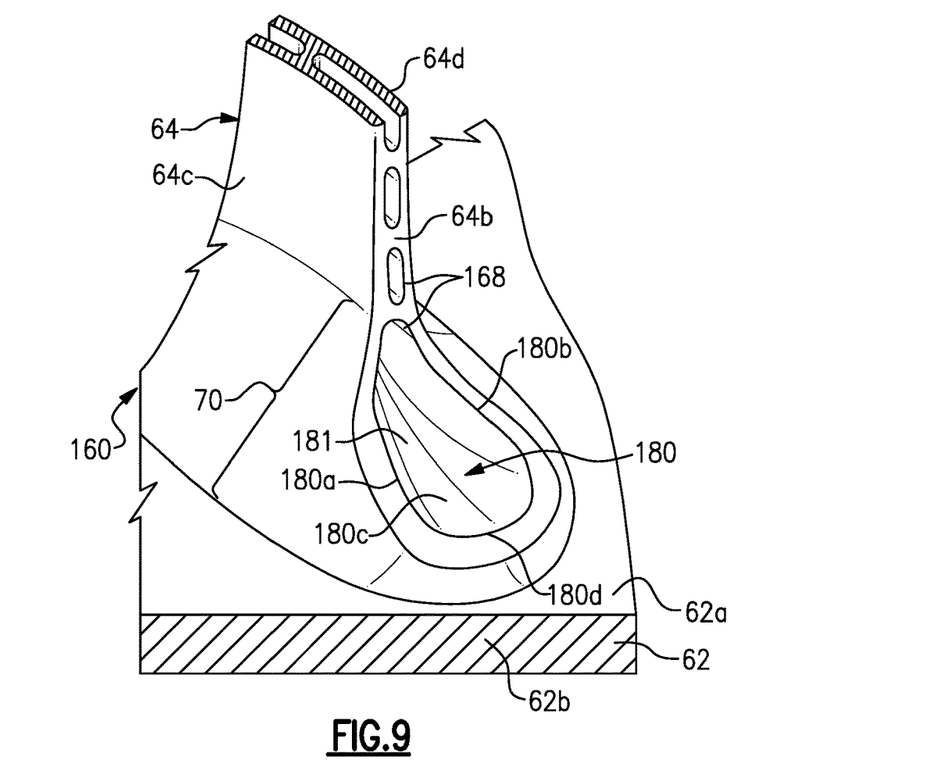
FIG. 9 illustrates another example airfoil that has an axially diverging ramp.

FIG. 9 illustrates an airfoil 160 that, in comparison to the airfoil 60, has a geometry that accounts for core position tolerance during casting and thus enables greater repeatability in manufacturing. As shown, the airfoil 160 includes axial cooling slots 168. The radially inner-most one of the axial cooling slots 168 opens through the transition region 70 and defines a circumferentially diverging ramp 180 in the transition region 70. The ramp 180 is defined by first and second circumferential edges 180a/180b that diverge from each other toward a platform trailing end 62b before converging to a rounded ramp trailing edge 180c. The ramp 180 has a radial floor 180d that is bowed from the first circumferential edge 180a to the second circumferential edge 180b. The radial floor 180d is radially sloped toward the platform trailing end 62b, and at least a portion of the radial floor 180d is radially inboard of the core gas path surface 62a. The top, i.e. the radially outer plane from the first circumferential edge 180a to the second circumferential edge 180b, is radially open. The airfoil 160 may further include a barrier coating 181, such as but not limited to a stabilized zirconia coating. However, the axial cooling slot 168 and ramp 180 are of sufficient size to prevent plugging by the coating 181 and thereby ensure that the slot 168 remains non-metering. That is, if a substantial amount of coating material plugs a slot, the flow area of the slot may be reduced to an extent at which it restricts outflow.

As will be discussed below, the ramp 180 mitigates the effects of variations in the relative position of the axial cooling slots 168 relative to the gas path surface 62a. The ramp 180 may also facilitate a smooth flow of cooling air from the axial cooling slot 168 into the core gas path C due to the bowing and floor slope, a reduction in metal mass in the transition region 70, an increase in surface area (e.g., via the radial floor 180d), and an increase in the area of the axial cooling slot 168 to reduce the possibility that a later-applied coating plugs the slot 168 and to allow ejection of debris particles from the airfoil 160. Additionally, during machining, the divergent geometry of the ramp 180 may also facilitate access to clean out any grinding chips that may settle into the slot 168.

Figure 10:
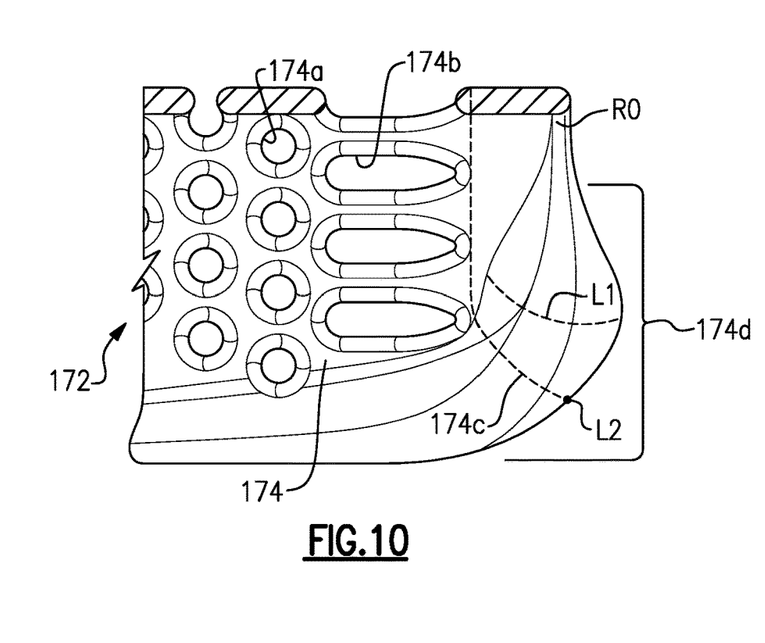
FIG. 10 illustrates an investment casting core for manufacturing the airfoil of FIG. 9.

FIG. 10 illustrates the investment core 172 that is configured to form the axial cooling slot 168 and ramp 180. The investment core 172 is similar to the above-described core 72 in that it also includes a core body 174 with pedestal openings 174a and teardrop openings 174b. However, the radially inner section of the oversize region 174c includes an enlarged lobe 174d that is configured to form the circumferentially diverging ramp 180. For instance, in comparison to the radially outer section of the oversize region 174c (e.g., at location RO), the enlarged lobe 174d is enlarged in the circumferential direction and extends farther aft in the axial direction (both relative to engine central longitudinal axis A). Thus, in the example shown, the cross-sectional area of the oversize region 174c through the lobe 174d taken in a plane parallel to the engine central longitudinal axis A increases from the location RO along the radially inward direction to a location L1. The cross-sectional area of the lobe 174d is at its maximum at L1 and then decreases a remainder of the radial inner distance of the oversize region 174d and through an elbow location L2, at which point the edge of the core 172 curves forward beyond the radial plane of the location RO.

Figure 11:
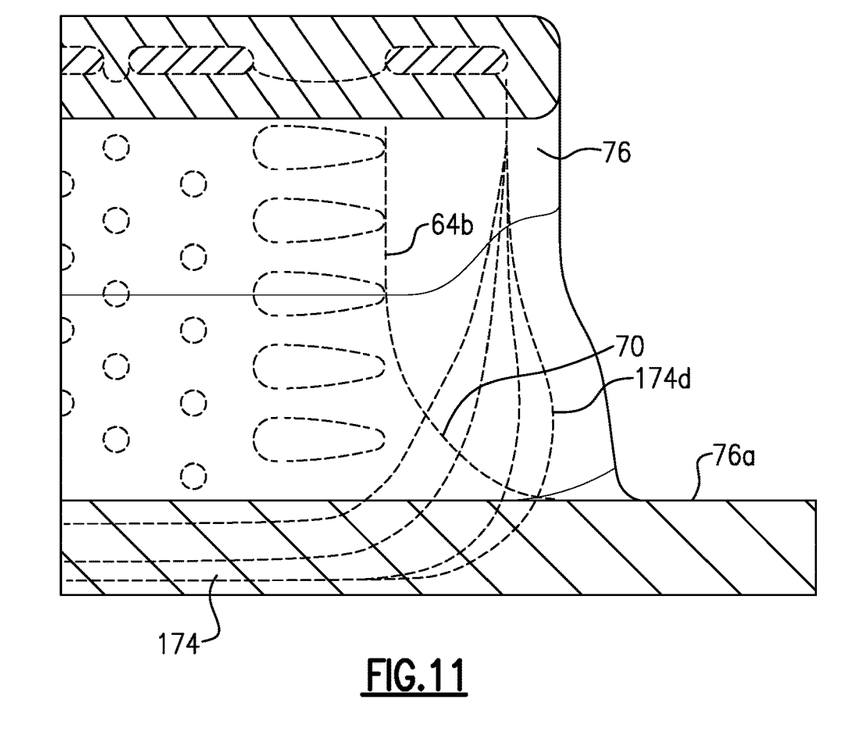
FIG. 11 illustrates the core of FIG. 10 embedded in wax.

FIG. 11 illustrates the investment core 172 enveloped in wax 76, with the trailing end 64b and transition region 70 of the final airfoil 160 superimposed thereon. When the metal that encases the oversize region 174c is machined back in order to open the axial cooling slots 168, the plane of the machining will cut through the region that corresponds to the lobe 174d, thereby also opening the circumferentially diverging ramp 180. The geometry of the ramp 180 thus correspond to the profile of the lobe 174d.

The size of the lobe 174d in terms of the locations RO and L2 is at least equal to, but is preferably larger than, the maximum tolerance that the position of the core 172 can vary with respect to the gas path surface 162a. Thus, at any position within the maximum tolerance envelope, the machined plane will cut through the region that corresponds to the lobe 174d. This assures that the circumferentially diverging ramp 180, with its desirable geometry, will be opened during machining, rather than the highly variable geometry that results from core position variation for airfoil 60.

The lobe 174d begins to radially decrease and circumferentially widen within the prescribed diffusion area flow area changes of the other axial cooling slots 168. This is a change in geometry which maintains a consistency of flow area that begins just after the aft most metering location of the axial cooling slot 168. The metering area is defined by the minimum cross-sectional area between trailing edge features, and the diffusion area is defined as the region between the metering location and the trailing edge of the trailing edge internal features. Beyond the diffusion region of the trailing edge slot, the lobe 174d continues to widen and ramp toward and beyond the gas path to a degree that will account for any possible coating material that is deposited onto the ramp 180 and ensure that any radial movement of the investment core relative to the wax will produce an acceptable and repeatable trailing edge exit geometry.

Figure 12:
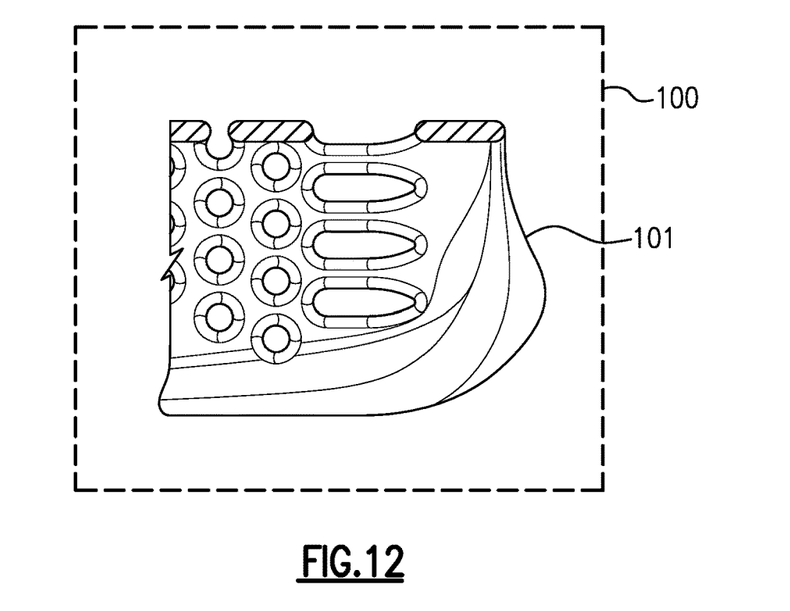
FIG. 12 illustrates a tool for manufacturing the investment casting core of FIG. 10.

FIG. 12 schematically illustrates an investment casting tool 100 that may be used in a molding process to form the refractory casting core 172 disclosed herein. For example, the casting tool 100 is formed of a metal alloy and may contain a hard-facing or other protective surface to reduce wear and erosion. The tool 100 includes a molding cavity 101. In this example, the molding cavity 101 is shown as an inverse view, e.g., the refractory casting core as represented and described in FIG. 10. The molding cavity 101 thus has the attributes of the core as described herein.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
   a platform defining a platform leading end and a platform trailing end; and
   an airfoil section extending from the platform and defining a leading end and a trailing end oriented, respectively, toward the platform leading end and the platform trailing end, and suction and pressure sides, the airfoil section having a transition region through which the airfoil section blends into the platform, the trailing end of the airfoil section having an axial cooling slot opening through the transition region and defining a circumferentially diverging ramp in the transition region, the circumferentially diverging ramp is radially sloped toward the platform trailing end, and the platform defining a core gas path surface and the radial floor is radially inboard of the core gas path surface.

2. The airfoil as recited in claim 1, wherein the circumferentially diverging ramp is radially open.

3. The airfoil as recited in claim 1, wherein the circumferentially diverging ramp has first and second circumferential edges and a radial floor there between that is bowed from the first circumferential edge to the second circumferential edge.

4. The airfoil as recited in claim 1, wherein the circumferentially diverging ramp has first and second circumferential edges that diverge from each other toward the platform trailing end.

5. The airfoil as recited in claim 1, wherein the airfoil section includes a barrier coating on the circumferentially diverging ramp, and wherein the axial cooling slot with the barrier coating is non-metering for cooling flow there from.

6. The airfoil as recited in claim 1, wherein the circumferentially diverging ramp is radially open and radially sloped.

7. The airfoil as recited in claim 6, wherein the circumferentially diverging ramp has first and second circumferential edges that diverge from each other toward the platform trailing end.

8. The airfoil as recited in claim 7, wherein the circumferentially diverging ramp has a radial floor between the first and second circumferential edges that is bowed from the first circumferential edge to the second circumferential edge.

9. The airfoil as recited in claim 1, wherein the transition region does not have any inflection points, is tangent to both the surface of the airfoil section, and is also tangent to a gas path surface on the platform.

10. The airfoil as recited in claim 1, wherein the circumferentially diverging ramp has first and second circumferential edges that diverge from each other toward a platform trailing end and then converge to a rounded ramp trailing edge.

11. A gas turbine engine comprising:
    a compressor section;
    a combustor in fluid communication with the compressor section; and
    a turbine section in fluid communication with the combustor, the turbine section having airfoils disposed about a central axis of the gas turbine engine, each of the airfoils includes:
    a platform, and
    an airfoil section extending from the platform and defining leading and trailing ends and suction and pressure sides, the airfoil section having a transition region through which the airfoil section blends into the platform, the trailing end of the airfoil section having an axial cooling slot opening through the transition region and defining a circumferentially diverging ramp in the transition region, the circumferentially diverging ramp having first and second circumferential edges and a radial floor there between that is continuously bowed from the first circumferential edge all the way to the second circumferential edge, and the platform defining a core gas path surface and the radial floor is radially inboard of the core gas path surface.

12. The gas turbine engine as recited in claim 11, wherein the circumferentially diverging ramp is radially open.

13. The gas turbine engine as recited in claim 11, wherein the circumferentially diverging ramp is radially sloped.

14. The gas turbine engine as recited in claim 11, wherein the platform defines a platform trailing end, and the circumferentially diverging ramp has first and second circumferential edges that diverge from each other toward the platform trailing end.

15. The gas turbine engine as recited in claim 11, wherein the airfoil section includes a barrier coating on the circumferentially diverging ramp, and wherein the axial cooling slot with the barrier coating is non-metering for cooling flow there from.

* * * * *